United States Patent [19]
Gonze et al.

[11] Patent Number: 6,143,345
[45] Date of Patent: *Nov. 7, 2000

[54] CHOCOLATE COMPOSITION

[75] Inventors: Michel Henri André Gonze, Brussels; Freddy Maurits Luc Van Der Schueren, Aalst, both of Belgium

[73] Assignee: Cerestar Holding B.V., Sas van Gent, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/598,533

[22] Filed: Feb. 8, 1996

[30] Foreign Application Priority Data

Feb. 14, 1995 [GB] United Kingdom .................... 9502794

[51] Int. Cl.⁷ ........................................................ A23L 1/236
[52] U.S. Cl. ........................................... 426/548; 426/660
[58] Field of Search .................................... 426/548, 660, 426/658, 659, 631

[56] References Cited

U.S. PATENT DOCUMENTS 5,425,957   6/1995  Gaim-Marsoner et al. ............... 426/98
5,468,509  11/1995  Schlup et al. ........................... 426/548

FOREIGN PATENT DOCUMENTS 0 287 957  10/1988  European Pat. Off. .
0 303 295   2/1989  European Pat. Off. .
0 489 515   6/1992  European Pat. Off. .
0 511 761  11/1992  European Pat. Off. .
0 512 910  11/1992  European Pat. Off. .

OTHER PUBLICATIONS

Patent Abstract of Japan vol. 014 No. 109 (C–0695), Feb. 28, 1990 & JP–A–01 312960 (Mitsubishi Kasei Corp.) Dec. 18,1989.

Patent Abstract of Japan, vol. 014 No. 306 (C0735), Jul. 3, 1990 & JP–1–02 104243 (Nikken Chem Co Ltd) Apr. 1990.

*Primary Examiner*—Leslie Wong
*Attorney, Agent, or Firm*—Pillsbury Madison & Sutro LLP

[57] ABSTRACT

The present invention discloses a chocolate composition. The composition is characterised in that the normal sugar is replaced with a mixture of sugar alcohols. The mixture contains erythritol and maltitol in such a ratio that the cooling effect of erythritol is considerably reduced.

6 Claims, No Drawings

CHOCOLATE COMPOSITION

FIELD OF THE INVENTION

The present invention discloses a chocolate composition. The present invention also discloses a method for producing a chocolate with the said composition. The composition of the present invention comprises both erythritol and maltitol. Chocolates prepared using this composition have a mouthfeel which corresponds to the mouthfeel of a chocolate containing conventional sugars. The chocolates prepared show a considerable calorie reduction and the 'cooling effect' of erythritol is masked by the presence of maltitol.

REALTED TECHNOLOGICAL BACKGROUND

European patent application EP 0 498 515 describes a process for the production of chocolate. The application discloses that with the use of erythritol or maltitol as sweeteners the conching step used in the production of chocolates is carried out in the form of a dry conching step moreover, this step can be carried out at temperatures well above the normal temperature of 65° C. and suitably for a period of 6 to 16 hours. It is disclosed that the dry conching step can be used with both erythritol and maltitol.

The use of erythritol or maltitol as the sweetener instead of sucrose in the chocolate results in a product of similar appearance and organoleptic properties to an equivalent sucrose based chocolate. It is further shown in the application that the amount of cocoa butter can be reduced by 2 to 15% by weight there is therefore a considerable reduction in the amount of fat (calories).

When erythritol is used as a sweetener the calorie reduction achieved in comparison with sucrose standard is from about 28% to about 33% depending on the fat content (see Example I hereafter). In order for a product to be called 'light' the minimal calorie reduction should be 30%.

When a product with the required amount of erythritol to be called light was obtained it turned out that the chocolate had a strong 'cooling effect' due to the negative heat of solution of erythritol which is −23.3 kcal/kg.

The Japanese patent publication JP-A-02 104243 also discloses this cool mouthfeel from chocolates which is described as a desirable characteristic.

European patent application EP 0 511 761 describes the use of different combinations of sugar alcohols for the preparation of instant pie fillings and bakery creams.

The patent abstract JP-A-01 312960 mentions the use of different combinations of sugar alcohols in the preparation of kneaded powder cake.

EP 0 303 295 discloses the use of erythritol as a basis for preparing hard candies. It was found that the use of erythritol gives rise to brittle and easily breakable candies. The combination of erythritol and saccharides selected from sugars and sugar alcohols other than erythritol solves this problem.

EP 0 287 957 relates to the use of a combination of an intense sweetener and erythritol in food applications.

EP 0 512 910 relates to the reduction of the amount of fatty material in chocolates. Levels as low as 32% fat are claimed.

Some of the references cited above do not relate to chocolate compositions. The references relating to chocolates do not mention or solve the 'cooling effect' problem.

As mentioned before when erythritol is used as a sweetener the calorie reduction achieved in comparison with sucrose standard is from about 28% to about 33% depending on the fat content (see Example 1 hereafter). In order for a product to be called 'light' the minimal calorie reduction should be 30% when such a reduction is obtained the product has a cool mouthfeel.

When maltitol is used the chocolate obtained has a good mouthfeel however the calorie reduction is only 13%. (Based on 0.4 kcal/g for erythritol and 2.4 kca/g for maltitol).

SUMMARY OF THE INVENTION

The present invention solves the indicated problems by disclosing a novel composition. The present invention discloses a composition suitable for obtaining 'light' chocolate the composition of the present invention comprises erythritol and maltitol. Preferably, the maltitol and erythritol are mixed in a ratio of 30:70. The compositions of the present invention are favourably used in the dry and/or dry/wet conching step of the previously disclosed chocolate production process. The present invention therefore also discloses chocolates comprising both erythritol and maltitol.

DETAILED DESCRIPTION OF THE INVENTION

The present invention discloses a composition suitable for obtaining 'light' chocolate the composition of the present invention comprises erythritol and maltitol. The composition comprises erythritol and maltitol in a ratio ranging from 10%–90% to 90%–10 preferably 80%–20% to 60%–40% more preferably 70%–30%. All these compositions give rise to chocolates which can advantageously be produced by the dry and/or dry/wet conching step, which contain a considerably reduced amount of calories and fat and which are less cariogenic than the chocolates containing sucrose and the normal amount of cocoa butter. Preferably, erythritol and maltitol are used in such a ratio that the calorie reduction is at least 30% and that the 'cooling effect' of erythritol is absent. To obtain this it is preferable to blend the maltitol and erythritol in a ratio of 30%–70%. The compositions of the present invention can favourably be used in the dry and/or dry/wet conching step of the previously disclosed chocolate production process.

The present invention discloses chocolates comprising in addition to cocoa nib and cocoa butter a mixture of both erythritol and maltitol and no sucrose.

Using the indicated ratios the 'cooling effect' is considerably reduced without affecting the favourable process conditions. At the same time the product can still be considered as light.

The process of the present invention uses a chocolate composition which contains erythritol and maltitol, preferably in an amount in the range of from 30 to 60% by weight of the composition, more preferably in the range of 40 to 60% by weight, particularly in the range 45 to 55% by weight. The composition may contain 30 to 60%, preferably 30 to 50%, more preferably 35 to 45% by weight cocoa nib; and 10 to 20%, preferably 10 to 15% by weight cocoa butter in addition to the cocoa butter contained in the cocoa nib. In general, the use of erythritol and maltitol as the sweetener in the chocolate provides a product of similar appearance and organoleptic properties to an equivalent sucrose-based chocolate. The chocolates contain 2 to 15% by weight less cocoa butter than sucrose-based chocolates the 2 to 15% being made up by the equivalent amount of erythritol and maltitol. Cocoa nib, cocoa butter and erythritol and maltitol are essential components of the chocolate compositions according to the present invention but there may also be present other ingredients, particularly an emulsifier such as lecithin, preferably in an amount 0.1% to 0.5% by weight, a synthetic sweetener, e.g. aspartame in amounts to taste e.g. 0.01 to 0.05% by weight and any desired flavour e.g. vanilla. Other suitable emsulsifiers are selected from the group of synthetic phospholipids.

Before reaching the conching stage according to the invention the chocolate composition is first formed by mixing the various ingredients and may then be refined by gentle milling to reduce the crystal size of the components. The mixing of the ingredients may be effected by kneading the erythritol and maltitol, suitably in solid form, and preferably crystalline with cocoa nib and at least part of the additional cocoa butter at a temperature suitably in the range 25 to 60° C., preferably 30 to 40° C.

The conching step may be carried out in equipment conventionally used for this purpose at the temperatures and for the times described in the earlier EP 0 498 515 patent application. Typically, the process is performed as follows; a mixture of erythritol and maltitol is used as sweetener. After mixing the chocolate ingredients the composition is submitted to a conching step characterised in that the conching step is dry and/or dry/wet conching carried out at a temperature of at least 65° C., preferably in the range 65°–100° C. and the sugar alcohol is a mixture of erythritol and maltitol in which the maltitol has a purity greater than 90%, preferably greater than 95% especially about 99%. Preferably the conching step is performed between 75 and 85° C. for a period of up to 16 hours, preferably between 6 and 16 hours.

Finally, the chocolate after conching is tempered to give the required viscosity and flow characteristics the preferred temperature between 25° and 35° C. being similar to that used for sucrose based chocolate. Since dietetic chocolate containing sorbitol must be tempered over a low, restricted and critical temperature range (e.g. 22–23° C.) the use of erythritol and maltitol is advantageous since in this respect it may be used in the conventional sucrose based chocolate process without the need for modification.

After tempering, the chocolate may be cast into moulds or otherwise processed depending upon the application in question.

Using a blend of erythritol and maltitol instead of sucrose without changing the formulation gives a calorie reduction of 24% and a chocolate quality close to the standard is obtained.

By minor adaptation of the formulation, slight reduction of cocoa butter from 13.5 to 9.5% sugar free light (30% calorie reduction) chocolate having similar properties (organoleptic and physical) as the standard can be produced.

Although exemplified for chocolate production it is understood that maltitol can be applied in other cases for masking the undesired 'cooling effect' of erythritol. Other applications include confectionary products, e.g. chewing gum, lozenges, fondants especially applications wherein the 'cooling effect' of erythritol is undesired.

The invention will now be further illustrated by reference to the following Examples.

EXAMPLE 1

(Comparative Example)

Erythritol versus sucrose (standard) with 33% calorie reduction.

|  | Composition A | Composition B |
|---|---|---|
| Cocoa nib % | 39 | 42 |
| Cocoa butter % | 13 | 13.5 |
| Sucrose % | — | 44.2 |
| Erythritol % | 47.7 | — |
| Lecithin % | 0.28 | 0.28 |
| Vanillin % | 0.02 | 0.02 |

The preparation of the chocolate was performed as follows:

1) Mixing

In both Compositions, the cocoa nib, 23% of the added cocoa butter and the erythritol/sucrose were ground and mixed together to form a homogeneous mass at a temperature of 30 to 40° C.

2) Refining

Composition A from step (1) was gently milled on a five roller mill and after one pass the desired average particle size of 20 to 40 μm was achieved. Composition B required a longer residence time on the rollers and cooling water had to be fed at an increased rate to the rollers compared with Composition A. The temperature in this stage was 25° to 45° C.

3) Conching

Conching took place in a rotary concher of the "Petzholdt" type. Composition A was conched at 80° C. for 16 hours and composition B at 60° C. for 22 hours. The remaining cocoa butter and the lecithin were added to composition A after 14 hours and 15 hours respectively and to composition B after 20 and 21 hours respectively.

4) Tempering

Both compositions were tempered by reducing the temperature of the conched mass to 28 to 31° C. in order to induce the crystallisation of the fat in the chocolate in its stable beta-form.

The products of tempering were cast into moulds and after cooling were evaluated organoleptically by a taste panel and visually after a storage period of three months. Both products had excellent gloss, good breaking properties and mouth feel. After six months storage at ambient temperature no "bloom" was observed on the products.

EXAMPLE 2

Blend 70% erythritol/30% Malbit CH (maltitol) without adaptation of formulation with 24% calorie reduction

|  | Composition C |
|---|---|
| Cocoa nib % | 42 |
| Cocoa butter % | 13.5 |
| Erythritol % | 31.1 |
| Malbit CH % | 13.1 |
| Lecithin % | 0.28 |
| Vanillin % | 0.02 |

The preparation was as described in Example 1, with some slight modifications.

The chocolate was evaluated by a taste panel and judged to be of good quality with good appearance and excellent mouthfeel. The 'cooling effect' normally present when erythritol is used was completely absent.

EXAMPLE 3

Blend 70% erythritol/30% Malbit CH with adaptation of formulation to obtain a calorie reduction of 30%

|  | Composition D |
| --- | --- |
| Cocoa nib % | 40 |
| Cocoa butter % | 9.7 |
| Erythritol % | 35 |
| Malbit CH % | 15 |
| Lecithin % | 0.28 |
| Vanillin % | 0.02 |

Taste and mouthfeel were similar to the chocolate of Example 2. In this case the chocolate can be qualified as "light" since there is a 30% calorie reduction.

What we claimed is:

1. A lighter-caloric chocolate consisting essentially of cocoa nib and cocoa butter, and a combination of erythritol and maltitol, said chocolate being sucrose-free, wherein the erythritol and maltitol are present in a ratio of 70%–30%, and said lighter-caloric chocolate comprises between 30 and 60% by weight of the combination of erythritol and maltitol, and the lighter-caloric chocolate has no cooling effect when eaten.

2. The lighter-caloric chocolate of claim 1, wherein the chocolate comprises between 45 to 55 percent by weight of the combination of erythritol and maltitol, between 30 to 60 percent by weight cocoa nib, and between 10 to 20 percent by weight cocoa butter.

3. A composition suitable for obtaining chocolate comprising cocoa butter, cocoa nib and a mixture of erythritol and maltitol, wherein erythritol and maltitol are present in a ratio of 70%–30%, and said composition has no cooling effect when eaten.

4. The composition of claim 3, wherein the composition comprises between 30 to 60 percent by weight cocoa nib.

5. The composition of claim 3, wherein the composition comprises between 10 to 20 percent by weight cocoa butter.

6. The composition of claim 3, wherein the composition comprises between 45 to 55 percent by weight of the combination of erythritol and maltitol, between 30 to 60 percent by weight cocoa nib, and between 10 to 20 percent by weight cocoa butter.

* * * * *